(12) United States Patent
Lazzarin et al.

(10) Patent No.: US 12,140,251 B2
(45) Date of Patent: Nov. 12, 2024

(54) MACHINE, SYSTEM AND METHOD TO APPLY AT LEAST ONE CABLE TO A PIPELINE

(71) Applicant: SAIPEM S.P.A., Milan (IT)

(72) Inventors: Diego Lazzarin, Milan (IT); Enrico Girello, Milan (IT)

(73) Assignee: SAIPEM S.P.A., Milan (IT)

( * ) Notice: Subject to any disclaimer, the term of this patent is extended or adjusted under 35 U.S.C. 154(b) by 0 days.

(21) Appl. No.: 18/026,239

(22) PCT Filed: Sep. 16, 2021

(86) PCT No.: PCT/IB2021/058460
§ 371 (c)(1),
(2) Date: Mar. 14, 2023

(87) PCT Pub. No.: WO2022/058927
PCT Pub. Date: Mar. 24, 2022

(65) Prior Publication Data
US 2023/0358337 A1 Nov. 9, 2023

(30) Foreign Application Priority Data

Sep. 16, 2020 (IT) .................... 102020000021859

(51) Int. Cl.
*H02G 1/10* (2006.01)
*B23P 19/04* (2006.01)
(Continued)

(52) U.S. Cl.
CPC ................ *F16L 1/20* (2013.01); *B23P 19/04* (2013.01); *F16L 53/38* (2018.01); *H02G 1/06* (2013.01); *H02G 1/10* (2013.01)

(58) Field of Classification Search
CPC ... F16L 1/20; F16L 53/38; H02G 1/10; H02G 1/106; B23P 19/04
See application file for complete search history.

(56) References Cited

U.S. PATENT DOCUMENTS 10,059,559 B2    8/2018   Longuet et al.

FOREIGN PATENT DOCUMENTS

EP    0 548 231 A1    6/1993
GB    2 514 446 A     11/2014
(Continued)

OTHER PUBLICATIONS

Notification Concerning Submission, Obtention or Transmittal of Priority Document for International Application No. PCT/IB2021/058460 dated Nov. 9, 2021.
(Continued)

*Primary Examiner* — Jermie E Cozart
(74) *Attorney, Agent, or Firm* — Neal, Gerber & Eisenberg LLP

(57) ABSTRACT

A machine for applying at least one cable to a pipeline comprises: a frame extending along a longitudinal axis; a gripping and moving device mounted on the frame and configured to couple the machine around the pipeline and move the machine along the pipeline in a travel direction parallel to the longitudinal axis; and a cable application equipment comprising a rotating open ring structure, which is configured to rotate with respect to the frame and around the pipeline when the machine is gripping the pipeline; and an unwinding device for the controlled unwinding of a reel of cable; unwinding device being mounted on rotating open ring structure.

9 Claims, 5 Drawing Sheets

(51) Int. Cl.
   *F16L 1/20*     (2006.01)
   *F16L 53/38*    (2018.01)
   *H02G 1/06*     (2006.01)

(56) References Cited

FOREIGN PATENT DOCUMENTS

WO       WO-0129470 A1 *   4/2001  ............... F16L 1/20
WO       WO 2005/103544 A2    11/2005
WO       WO 2018/096474 A1     5/2018

OTHER PUBLICATIONS

International Search Report and Written Opinion for International Application No. PCT/IB2021/058460 dated Jan. 21, 2022.
Three Notifications of the Recording of a Change for International Application No. PCT/IB2021/058460.

* cited by examiner

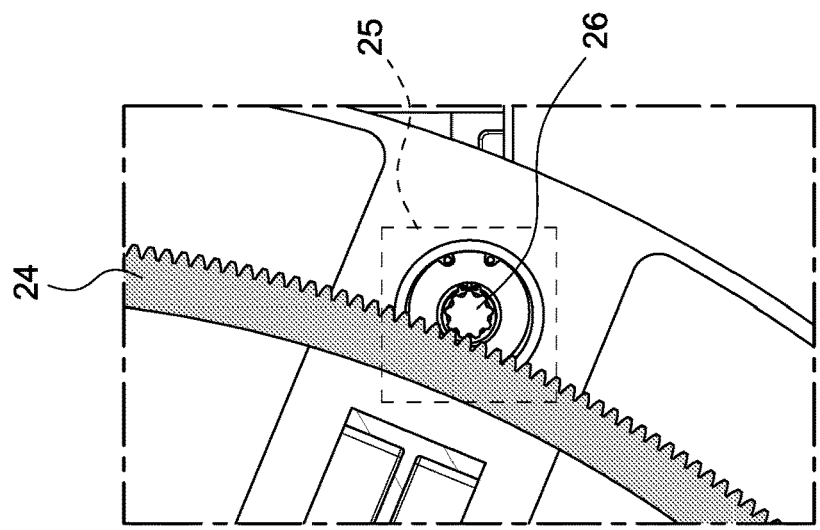
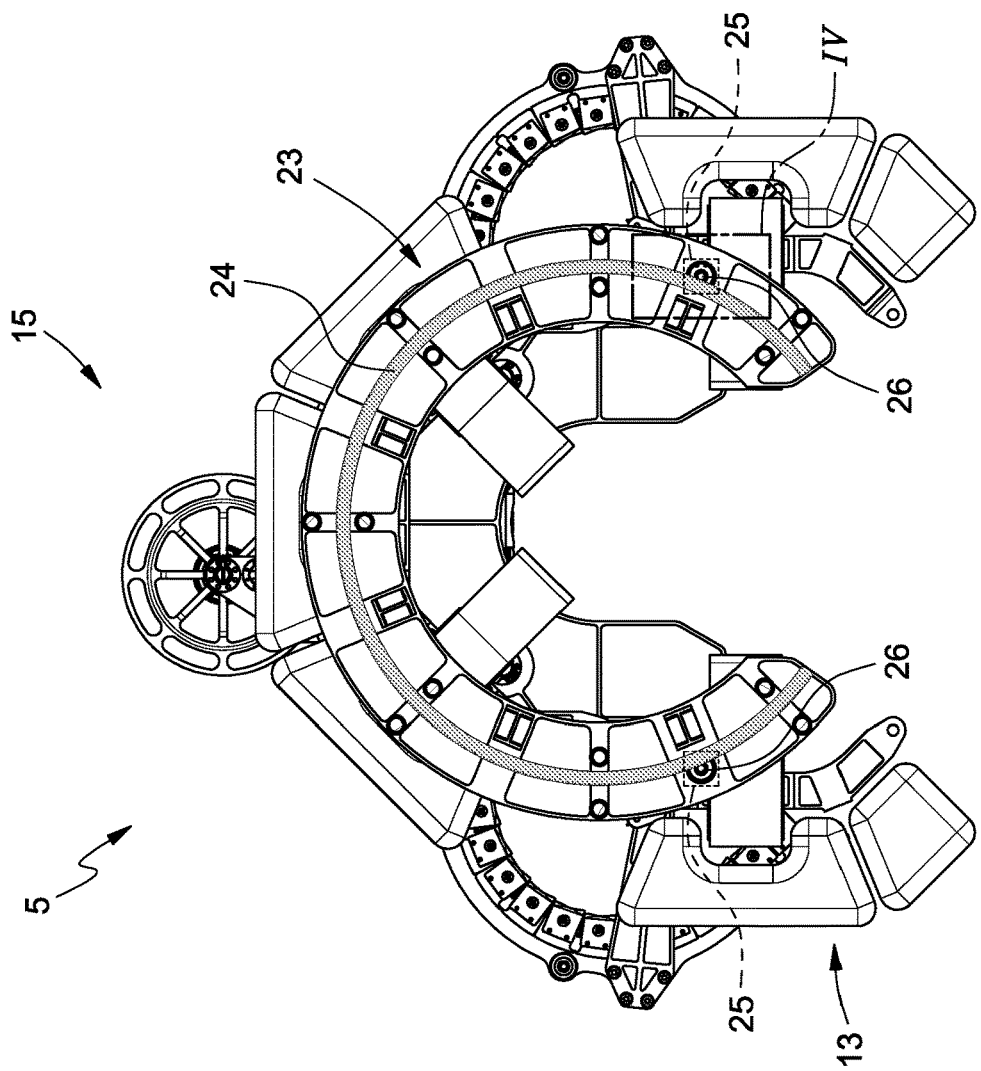
FIG. 4
FIG. 3

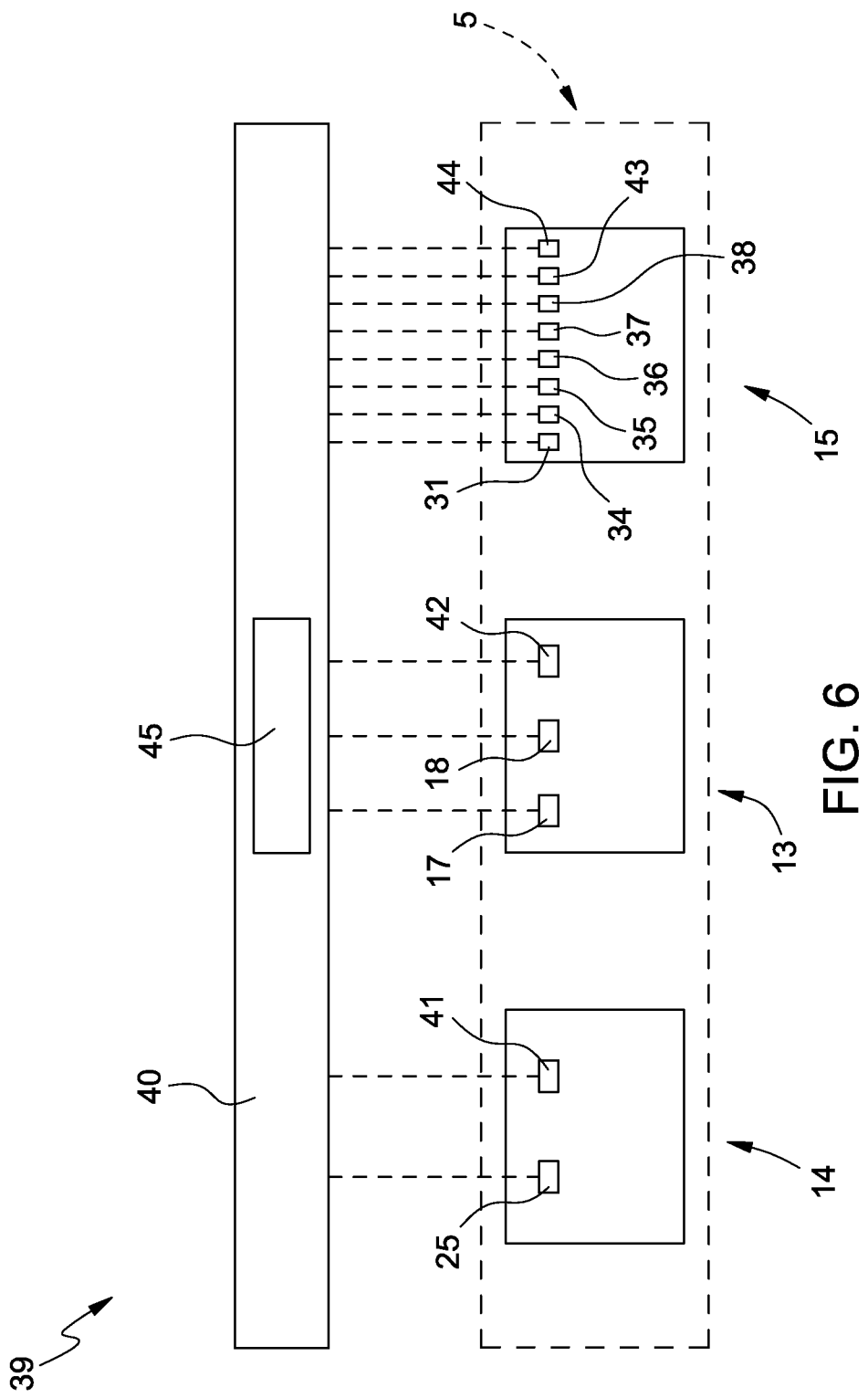

MACHINE, SYSTEM AND METHOD TO APPLY AT LEAST ONE CABLE TO A PIPELINE

PRIORITY CLAIM

This application is a national stage application of PCT/IB2021/058460, filed on Sep. 16, 2021, which claims the benefit of and priority to Italian Patent Application No. 102020000021859, filed on Sep. 16, 2020, the entire contents of which are each incorporated by reference herein.

TECHNICAL FIELD

The present disclosure relates to a machine for applying at least one cable to a pipeline, in particular in a body of water.

BACKGROUND

In the oil sector, a cable coupled to a pipeline, generally underwater, finds various applications.

In underwater oil fields, hydrocarbons are transferred from the field along metal pipes laid on the seabed and rising ("risers") towards a surface plant which has the function of managing production and processing the product so that the product can be transferred at greater distances to a refinery, but also of unloading the product onto oil tankers or gas tankers. In this context, a first application of the cable involves the transfer of monitoring signals from sensors to monitor the dynamic behavior (i.e., the oscillations at various frequencies of the riser), generally induced by the motion of a floating plant (FPSO) to which the riser is connected.

A second application involves the monitoring of the deformation of span pipe sections subject to vibrations induced by the current and/or by the transported fluid.

A third application involves the installation of heating power cables for heating underwater pipes or sections of underwater pipes.

According to certain of the prior art, the cable is applied to the pipeline during the launching phase (piggy back cable) on board a laying vessel and just before the pipeline is launched. The space available for carrying out these operations on board a laying vessel is generally limited, sometimes the type of launch itself makes it relatively difficult to apply the cable around the pipeline before the laying (the J-lay launching method), and if the operations are carried out by personnel, these operations involve risks. Moreover, when the launching operations comprise joining individual sections of the pipeline, it is also necessary to join the individual sections of the cable, as happens for example in the J-lay launching method.

SUMMARY

One object of the present disclosure is to provide a machine for applying at least one cable to a pipeline, which is free from certain of the drawbacks of certain of the prior art.

According to the present disclosure, a machine is provided for applying at least one cable to a pipeline, the machine comprising: a frame extending along a longitudinal axis; a gripping and moving device mounted on the frame and configured to couple the machine around the pipeline and move the machine along the pipeline in a travel direction parallel to the longitudinal axis; a cable application equipment comprising a rotating open ring structure, which is configured to rotate with respect to the frame and around the pipeline when the machine is gripping the pipeline; and an unwinding device for the controlled unwinding of a reel of cable; said unwinding device being mounted on said rotating open ring structure; a strapping apparatus mounted on the frame for applying straps around the cable and the pipeline.

The present disclosure enables the cable to be applied to the pipeline in the body of water in a completely automatic way. In particular, the gripping and moving device comprises a plurality of gripping members, two of which articulated to the frame and movable between an open position to enable the insertion of the pipeline between the gripping members, and a closed position to tighten the pipeline between the gripping members. This enables the machine to be coupled to the pipeline so that the machine is integral with the pipeline and runs in a determined travel direction with respect to the pipeline.

In particular, each gripping member is motorized to move the machine along the pipeline, in particular each gripping member is a motorized track. This enables the travel of the machine along the pipeline to be controlled in a relatively simple way.

In particular, the machine comprises a plurality of unwinding devices for the controlled unwinding of respective cables from respective reels, the unwinding devices being supported by the rotating open ring structure to rotate together with the rotating open ring structure.

In particular, the machine comprises at least one thrust module coupled to the frame to provide the machine with a given or designated hydrostatic thrust to facilitate the installation of the machine on the pipeline.

In particular, the cable application equipment is mounted at the head of the frame and the strapping apparatus is mounted at the rear of the frame with respect to the direction of travel of the machine. In this way, from the operational point of view, the cable application equipment winds the cable in a helical manner around the pipeline as the machine advances and the strapping apparatus applies a succession of straps around the pipeline and the cable wound around the pipeline during a machine stop.

In particular, the strapping apparatus comprises: a support element fixed to the frame: a strap feeding device; two arms movable with respect to the support element and configured to guide a strap around the pipeline and the cable; a clamping device configured to hold an end portion of the strap; an advancing device configured to advance and tighten the strap around the pipeline and the cable; a junction device configured to join two overlapping portions of the strap to close the strap around the pipeline and the cable; and a cutting device configured to separate the strap upstream of the joined portion. In this way, a strap can be guided and applied in the body of water around a selected zone of the pipeline in a relatively inexpensive and reliable manner.

A further object of the present disclosure is to provide a system for applying at least one cable to a pipeline in a body of water, which overcomes (or at least mitigates) certain of the drawbacks of certain of the prior art.

According to the present disclosure, a system is thus provided for applying at least one cable to a pipeline, the system comprising: the machine for applying at least one cable to a pipeline as described herein; and two clamps, each of which is configured to be mounted around the pipeline and comprises at least one connector configured to be connected to one end of the cable to secure the two ends of the cable to the pipeline.

In particular, the system comprises a remotely operated vehicle ("ROV") for installing the machine on the pipeline, closing the clamps around the pipeline, and optionally attending to the operation of said machine. In this way, the ROV supports the cable application operations, optionally supplying the machine with electrical and/or hydraulic power, a control unit, and a system for communicating with the surface of the body of water.

A further object of the present disclosure is to provide a method for applying at least one cable to a pipeline in a body of water, which at least mitigates certain of the drawbacks of certain of the prior art.

According to the present disclosure, a method is thus provided for applying at least one cable to a pipeline in a body of water, the method comprising: coupling a frame of a machine to apply the at least one cable around the pipeline; attaching one end of the cable of a reel supported by the machine to the outer surface of the pipeline; moving the machine in a determined travel direction along the pipeline using the pipeline as a guide for the machine to unwind the cable from the reel; rotating the reel with respect to the frame and around the pipeline as the machine advances to wind the cable in a helical manner around the pipeline; and applying a succession of straps around the pipeline and the cable laid around the pipeline. This method enables the cable to be applied to the pipeline in a completely automatic way by the cable application machine.

A further object of the present disclosure is to provide a computer program which mitigates certain of the drawbacks of certain of the prior art described herein.

In accordance with the present disclosure, a computer program is provided, which is configured to control a machine and can be directly loaded into a memory of the computer to carry out the steps of the method as described above, when the program is implemented by the computer. The program enables the method to be implemented in a relatively simple and economical way. Furthermore, the present disclosure relates to a program product comprising a readable medium on which the program is stored.

BRIEF DESCRIPTION OF THE DRAWINGS

Further features and advantages of the present disclosure will be apparent from the following description of a non-limiting embodiment thereof, with reference to the Figures of the accompanying drawings, wherein:

FIG. 3 is a front view, with schematized parts and parts removed for clarity, of the machine of FIG. 2;

FIG. 4 is a front view, with parts removed for clarity and parts on an enlarged scale, of a detail of FIG. 3;

FIG. 6 is a schematic view, with parts removed for clarity, of a control device of the system of FIG. 1.

DETAILED DESCRIPTION

Figure 1:
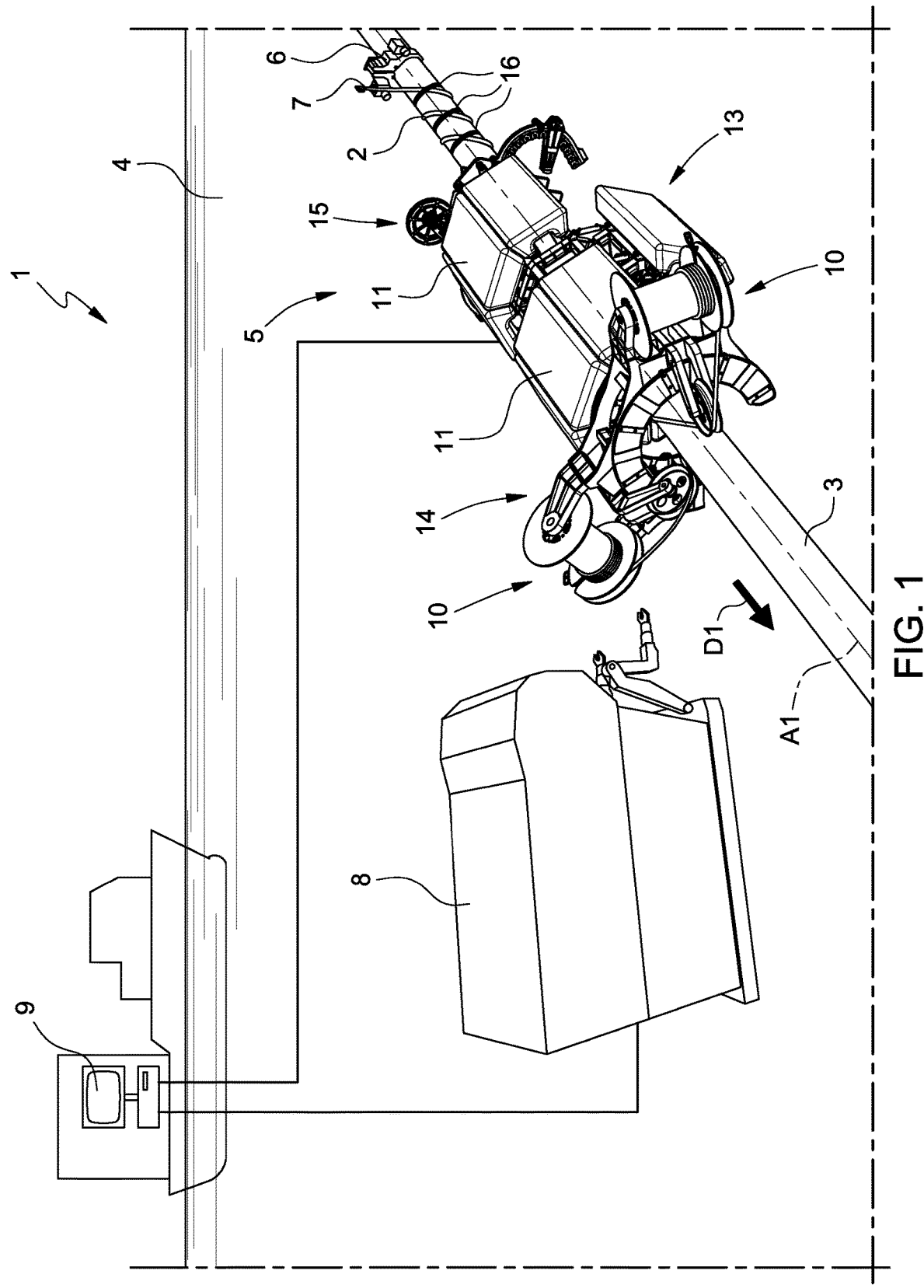
FIG. 1 is a perspective view, with parts removed for clarity and schematized parts, of a system for applying at least one cable to a pipeline provided in accordance with the present disclosure.

With reference to FIG. 1, reference numeral 1 indicates, as a whole, a system for applying at least one cable 2—two cables 2 in the example shown herein—to a pipeline 3 in a body of water 4. The system 1 comprises a machine 5 configured to apply the cable 2; two clamps 6 (only one of which is shown in FIG. 1) configured to be clamped around the pipeline 3 and provided with respective connectors 7 configured to be connected to one end of the cables 2; an ROV 8; and a control station 9, which, in the non-limiting example of the present disclosure shown herein, is arranged on the surface of the body of water 4.

The machine 5 is configured to be coupled to the pipeline 3; move along the pipeline 3 using the pipeline 3 as a guide; unwind the cables 2 from respective reels 10 along the pipeline 3; wind each cable 2 in a helical manner around the pipeline 3; and attach each cable 2 to the pipeline 3.

The machine 5 comprises a plurality of thrust modules 11 which make the machine 5 particularly suitable for underwater use.

The ROV 8 is configured to install the machine 5 on the pipeline 3, close the clamps 6 around the pipeline 3, and optionally attend to the operation of the machine 5.

In accordance with a variant of the present disclosure (not shown in the drawings), the ROV 8 is configured to transmit electrical and/or hydraulic power to the machine 5 and control the machine 5.

Figure 2:
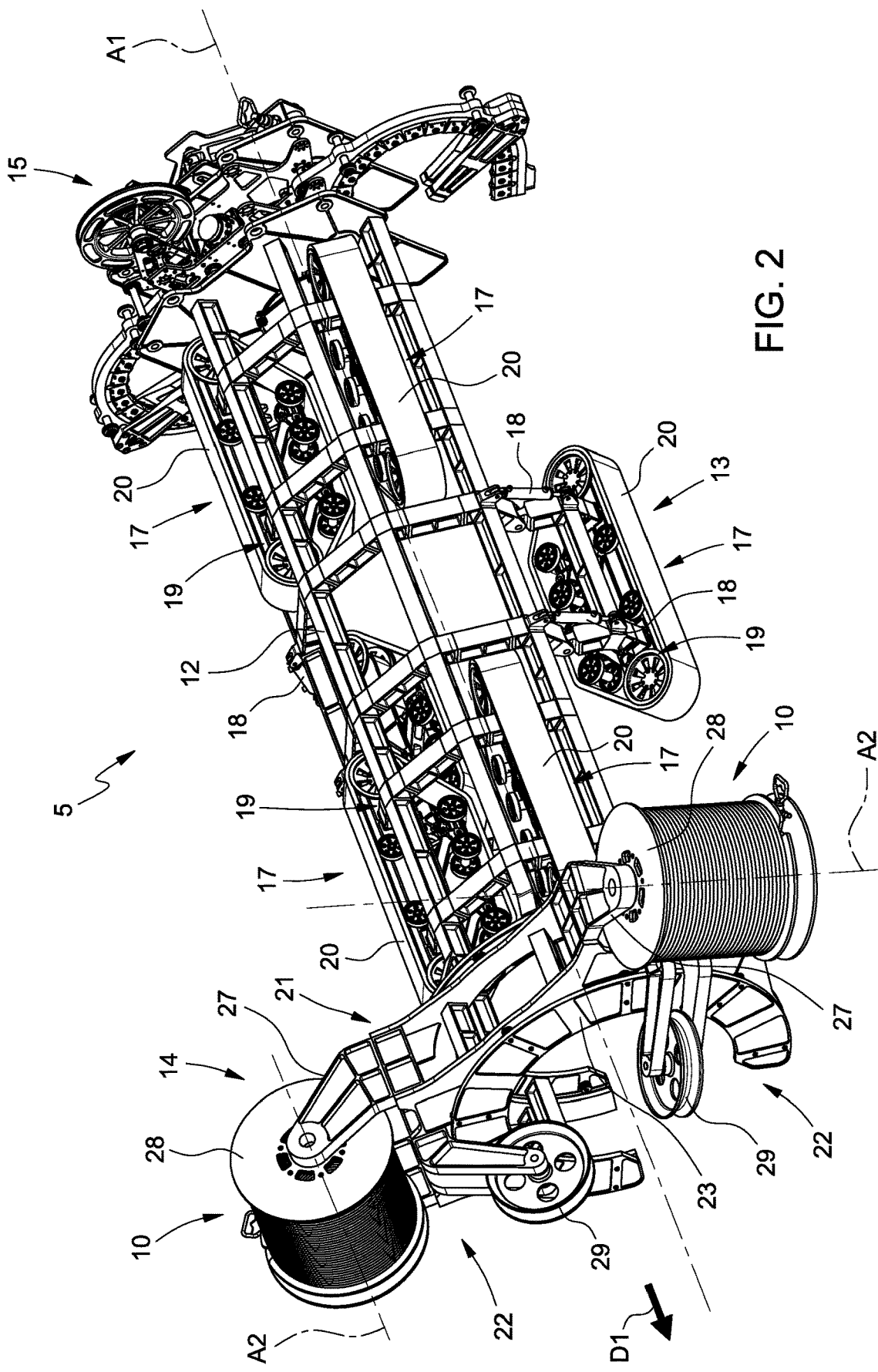
FIG. 2 is a perspective view, with parts removed for clarity, of a machine for applying at least one cable of the system of FIG. 1.

With reference to FIG. 2, in which the thrust modules 11 have been removed, the machine 5 comprises a frame 12 extending along a longitudinal axis A1; a gripping and moving device 13 mounted on the frame 12 and configured to couple the machine 5 around the pipeline 3 and move the machine 5 along the pipeline 3 (FIG. 1) in a travel direction D1 parallel to the longitudinal axis A1; a cable 2 application equipment 14; and a strapping apparatus 15 configured to apply straps 16 (FIG. 1) around the cables 2 and the pipeline 3 (FIG. 1).

The frame 12 extends mainly along the longitudinal axis A1 and supports, at its opposite ends along the longitudinal axis A1, the cable application equipment 14 and the strapping apparatus 15 in succession with reference to the travel direction D1.

The frame 12 also supports, between the cable application equipment 14 and the strapping apparatus 15, a plurality of gripping members 17 configured to be arranged in contact with the pipeline 3 (FIG. 1).

Two gripping members 17 are articulated to the frame 12 and selectively movable with respect to the frame 12 by actuators 18 to enable the gripping members 17 to move between an open position and a closed position. Four gripping members 17 are mounted integral with the frame 12. This enables the pipeline 3 to be clamped between the gripping members 17 and the machine 5 to be integral with the pipeline 3 (FIG. 1).

At least one gripping member 17 is motorized to ensure the movement of the machine 5 along the pipeline 3 (FIG. 1). In the example shown herein, all the gripping members 17 are motorized so as to prevent the machine 5 from being subjected to unbalanced forces. In particular, each gripping member 17 comprises a carriage 19 and a track 20 such that the contact area between the gripping member 17 and the pipeline 3 can be extended.

The cable application equipment 14 comprises a rotating open ring structure 21, which is configured to rotate with respect to the frame 12 around the pipeline 3 when the machine 5 is gripping the pipeline 3 (FIG. 1); and two unwinding devices 22 configured to control the unwinding of the respective cables 2 from the respective reels 10.

The frame 12 includes an open ring structure 23 to house and guide the rotating open ring structure 21.

With reference to FIGS. 3 and 4, the open ring structure 23 comprises an open ring crown wheel 24 and supports two motors 25 and respective pinions 26 in mesh with the open ring crown wheel 24. The open ring crown wheel 24 has an extension greater than 180° and the pinions 26 are arranged such that the open ring crown wheel 24 is always in mesh with at least one of the two pinions 26.

With reference to FIG. 2, each unwinding device 22 is mounted on the rotating open ring structure 21 and comprises a support 27 configured to support a spool 28 on which a reel 10 of cable 2 is wound; and a pulley 29, which has the function of returning the cable 2 in the vicinity of the pipeline 3 (FIG. 1).

Each spool 28 is configured to rotate about a respective axis of rotation A2 to unwind the respective cable 2 from the respective reel 10. In particular, the rotation of each spool 28 about the respective axis of rotation A2 is braked by a respective braking device (not shown in the figures), so as to keep the respective cable 2 taut during the application of the cables 2 around the pipeline 3 (FIG. 1).

In accordance with a variant of the present disclosure, each spool 28 is motorized to control the rotation speed of each spool 28 about the respective axis of rotation A2 and keep the respective cable 2 taut.

Figure 5:
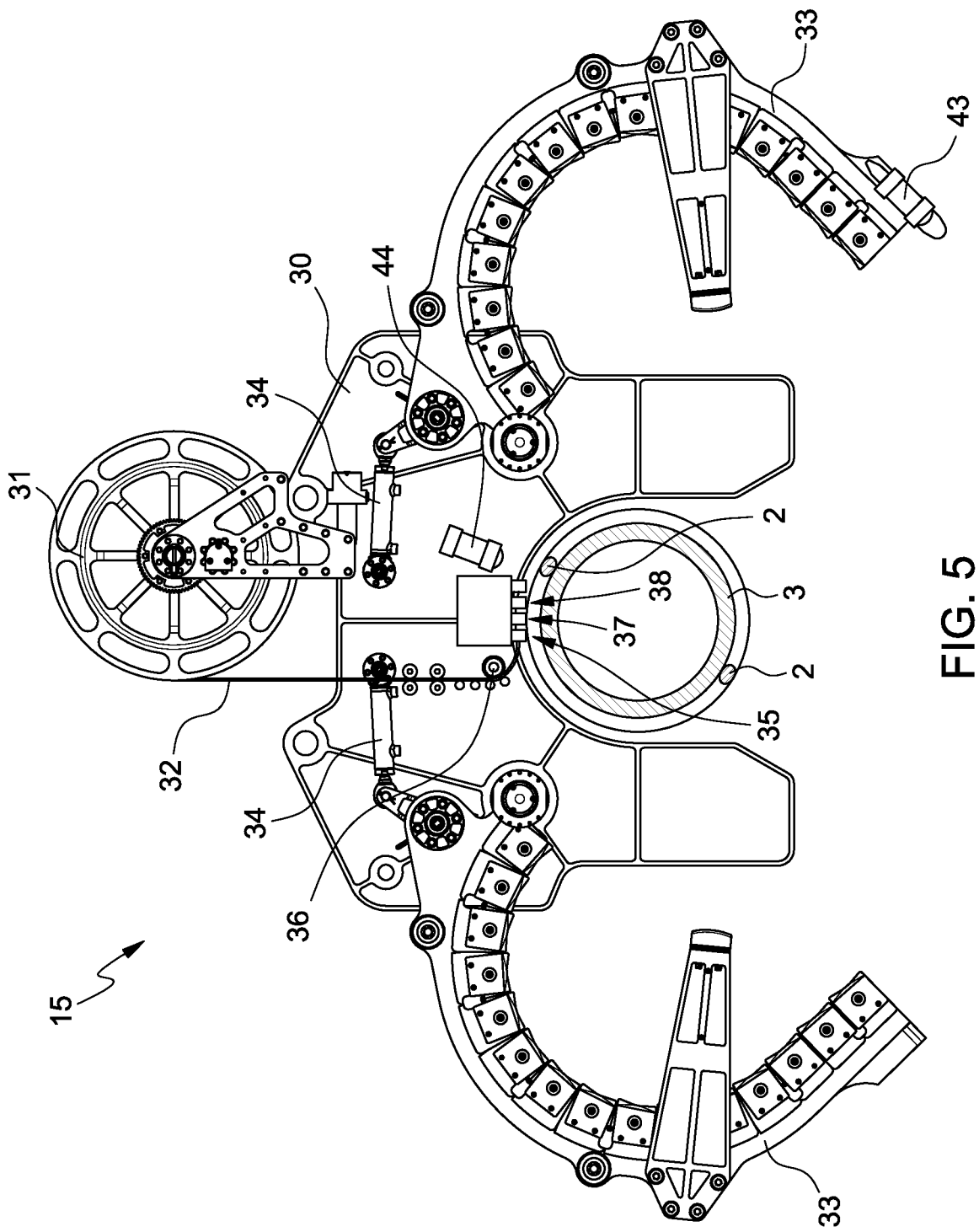
FIG. 5 is a side elevation view, with parts removed for clarity, of a strapping apparatus of the machine of FIG. 2.

With reference to FIG. 5, the strapping apparatus 15 comprises: a support element 30 fixed to the frame 12 (FIG. 2); a feeding device 31 configured to feed a band 32 from which the straps 16 are cut (FIG. 1); two arms 33 selectively movable with respect to the frame 12 between an open position and a closed position by respective actuators 34 and configured to guide the band 32 around the pipeline 3 and the cables 2; a clamping device 35 configured to hold an end portion of the band 32; an advancing device 36 configured to advance and tighten the band 32 around the pipeline 3 and the cables 2; a junction device 37 configured to join two overlapping portions of the band 32 to close the band 32 around the pipeline 3 and the cables 2; and a cutting device 38 configured to separate the band 32 from the junction area.

With reference to FIG. 6, the system 1 comprises a control device 39 configured to control the machine 5. The control device 39 comprises a control unit 40, which can be arranged on board the machine 5 itself or on board the ROV 8 or in the control station 9 floating on the surface of the body of water 4. The control device further comprises a sensor 41 configured to detect the position of the rotating open ring structure 21 with respect to the frame 12 (FIG. 2); at least one sensor 42 configured to detect the position of the gripping members 17; a sensor 43 configured to detect whether the arms 33 are in the closed position or in the open position; and a sensor 44 configured to detect whether the band 32 has two overlapping portions downstream of the junction device 37.

The control unit 40 is configured to control the two motors 25 according to the position of the rotating open ring structure 21 detected by the sensor 41 and to control the gripping members 17 and the actuators 18 according to the position detected by the sensor 42.

Moreover, the control unit 40 is configured to control the feeding device 31, the actuators 34 of the two arms 33, the clamping device 35, the advancing device 36, the junction device 37 and the cutting device 38 according to the signals detected by the sensors 43 and 44.

In addition, the control device 39 comprises a computer 45, which comprises a memory containing a program configured to control the system 1 and is configured to implement said program.

The computer 45 can be programmed directly or is configured to read program media through special interfaces.

In use and with reference to FIG. 1, the machine 5 is coupled around the pipeline 3 and clamped to the pipeline 3 by the closing of the gripping members 17 (FIG. 2) around the pipeline 3.

The ROV 8 tightens the clamp 6 (not shown in the figures) to which the starting ends of the cables 2 are fastened, around the pipeline 3.

At this point, with reference to FIG. 2, the machine 5 moves along the pipeline 3 by the tracks 20 of the gripping and moving device 13 and using the pipeline 3 as a guide.

At the same time, the motors 25 (FIGS. 3 and 4) rotate the rotating open ring structure 21 around the pipeline 3, and the two unwinding devices 22 unwind in a controlled manner the respective cables 2 from the respective reels 10 to wind the cables 2 in a helical manner around the pipeline 3 as the machine 5 advances.

In greater detail, as each cable 2 unwinds from the respective reel 10, the rotation of each spool 28 about the respective axis of rotation A2 is braked by a braking device (not shown in the figures).

At regular or predetermined intervals, the movement of the machine 5 along the pipeline 3 is stopped so as to alternate between forward and stop phases, during which the strapping apparatus 15 applies a strap 16 (FIG. 1) around the pipeline 3 and the cables 2.

With reference to FIG. 5, during this stop phase, the arms 33 are moved from the open position to the closed position, and the sensor 43 monitors the relative positions of the two arms 33 and supplies the relevant signals to the control unit 40.

When the arms 33 are in the closed position, the advancing device 36 feeds the band 32 inside the arms 33.

The sensor 44 detects the presence of the band 32 inside the arms 33 in a given or designated position and provides the relevant signals to the control unit 40.

After receiving the consent from the sensor 44, the control unit 40 actuates the clamping device 35 to hold the band 32.

Next, the advancing device 36 tightens the band 32 around the pipeline 3 and the cables 2, extracting the band 32 from the arms 33. Once the band 32 is tightened around the pipeline 3 and the cables 2, the junction device 37 joins the two overlapping portions of the band 32 to close the band 32 around the pipeline 3 and the cables 2. The sensor 44 monitors the outcome of the joining operation and supplies relevant signals to the control unit 40.

Subsequently, the cutting device 38 separates the band 32 upstream of the joined portion.

With reference to a non-limiting embodiment of the present disclosure, all the steps of the operations for applying the strap 16 (FIG. 1) around the pipeline 3 and the cables 2 are controlled by the control unit 40.

With reference to FIG. 1, when the operations for applying the cables 2 around the pipeline 3 are completed, the ROV 8 tightens the clamp 6, to which the terminal ends of the cables 2 are fastened, around the pipeline 3.

At this point, the gripping members 17 are moved from the closed position to the open position to uncouple the machine 5 from the pipeline 3.

In accordance with one embodiment, during the operations for applying the cables 2 around the pipeline 3, the ROV 8 assists the machine 5 in said operations. In particular, the ROV 8 transmits electrical and/or hydraulic power to the machine 5 and also controls the machine 5 visually by a video camera (not shown in the figures).

Lastly, it is clear that the present disclosure can be subject to variations with respect to the embodiment described above without however departing from the scope of the following claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A machine comprising:
 a frame extending along a longitudinal axis;
 a gripping and moving device mounted on the frame and configured to:
  couple the machine to a pipeline, and
  move the machine along the pipeline in a direction of travel parallel to the longitudinal axis;
 a cable application equipment comprising:
  a rotating open ring structure configured to rotate with respect to the frame and around the pipeline when the machine is coupled to the pipeline, and
  an unwinding device configured to control an unwinding of a cable from a reel, the unwinding device being mounted on the rotating open ring structure; and
 a strapping apparatus mounted on the frame and configured to apply a strap around the cable and the pipeline.

2. The machine of claim 1, wherein the gripping and moving device comprises a plurality of gripping members, two of the gripping members are articulated to the frame and movable between an open position to enable an insertion of the pipeline between the gripping members and a closed position to tighten the gripping members about the pipeline.

3. The machine of claim 2, wherein each gripping member is motorized to move the machine along the pipeline.

4. The machine of claim 1, further comprising a plurality of unwinding devices, each unwinding device configured to control an unwinding of a respective cable from a respective reel.

5. The machine of claim 1, further comprising a thrust module coupled to the frame.

6. The machine of claim 1, wherein the cable application equipment is mounted at a head of the frame relative to the direction of travel and the strapping apparatus is mounted at a rear of the frame relative to the direction of travel.

7. The machine of claim 6, wherein the strapping apparatus comprises:
 a support element fixed to the frame;
 a strap feeding device;
 two arms movable relative to the support element and configured to guide the strap around the pipeline and the cable;
 a clamping device configured to hold an end portion of the strap;
 an advancing device configured to advance and tighten the strap around the pipeline and the cable;
 a junction device configured to join two overlapping portions of the strap to close the strap around the pipeline and the cable; and
 a cutting device configured to separate the strap upstream of the joined portion.

8. A system comprising:
 a machine configured to apply a cable to a pipeline, the machine comprising:
  a frame extending along a longitudinal axis;
  a gripping and moving device mounted on the frame and configured to:
   couple the machine to the pipeline, and
   move the machine along the pipeline in a direction of travel parallel to the longitudinal axis;
  a cable application equipment comprising:
   a rotating open ring structure configured to rotate with respect to the frame and around the pipeline when the machine is coupled to the pipeline, and
   an unwinding device configured to control an unwinding of the cable from a reel, the unwinding device being mounted on the rotating open ring structure; and
  a strapping apparatus mounted on the frame and configured to apply a strap around the cable and the pipeline; and
 two clamps that are each configured to be mounted to the pipeline and comprise a connector configured to be connected to an end of the cable.

9. The system of claim 8, further comprising a remotely operated vehicle configured to install the machine on the pipeline and close the two clamps around the pipeline.

* * * * *